United States Patent [19]

Iacotti et al.

[11] 3,985,547

[45] Oct. 12, 1976

[54] IRON ORE REDUCTION IN MULTIPLE FLUIDIZED BEDS

[75] Inventors: Italo Iacotti; Giansilvio Malgarini; Edoardo Pasero, all of Rome, Italy

[73] Assignee: Centro Sperimentale Metallurgico S.p.A., Rome, Italy

[22] Filed: June 17, 1975

[21] Appl. No.: 587,630

[30] Foreign Application Priority Data

June 17, 1974   Italy .................................. 51566/74

[52] U.S. Cl. ..................................... 75/35; 75/26; 75/34; 75/91
[51] Int. Cl.² ........................................ C21B 13/00
[58] Field of Search ....................... 75/34, 35, 26, 91

[56] References Cited
UNITED STATES PATENTS

| | | |
|---|---|---|
| 2,797,989 | 7/1957 | Jensen .................................. 75/35 |
| 3,126,276 | 3/1964 | Marshall et al. ..................... 75/35 X |
| 3,375,099 | 3/1968 | Marshall ............................... 75/35 |
| 3,853,538 | 12/1974 | Nemeth ................................. 75/35 |

*Primary Examiner*—M. J. Andrews
*Attorney, Agent, or Firm*—Young & Thompson

[57] ABSTRACT

Iron ore is reduced in a multiple fluid bed reactor, the beds being vertically superposed in a tower and the ore passing by gravity downwardly from bed to bed. The lowermost and all superposed beds are fluidized by off gases from which carbon dioxide and water have been stripped; while a further portion of the fluidizing and reducing gas is provided by combusting methane with a substoichiometric quantity of oxygen and introducing the combustion products into an intermediate level of the column.

5 Claims, 1 Drawing Figure

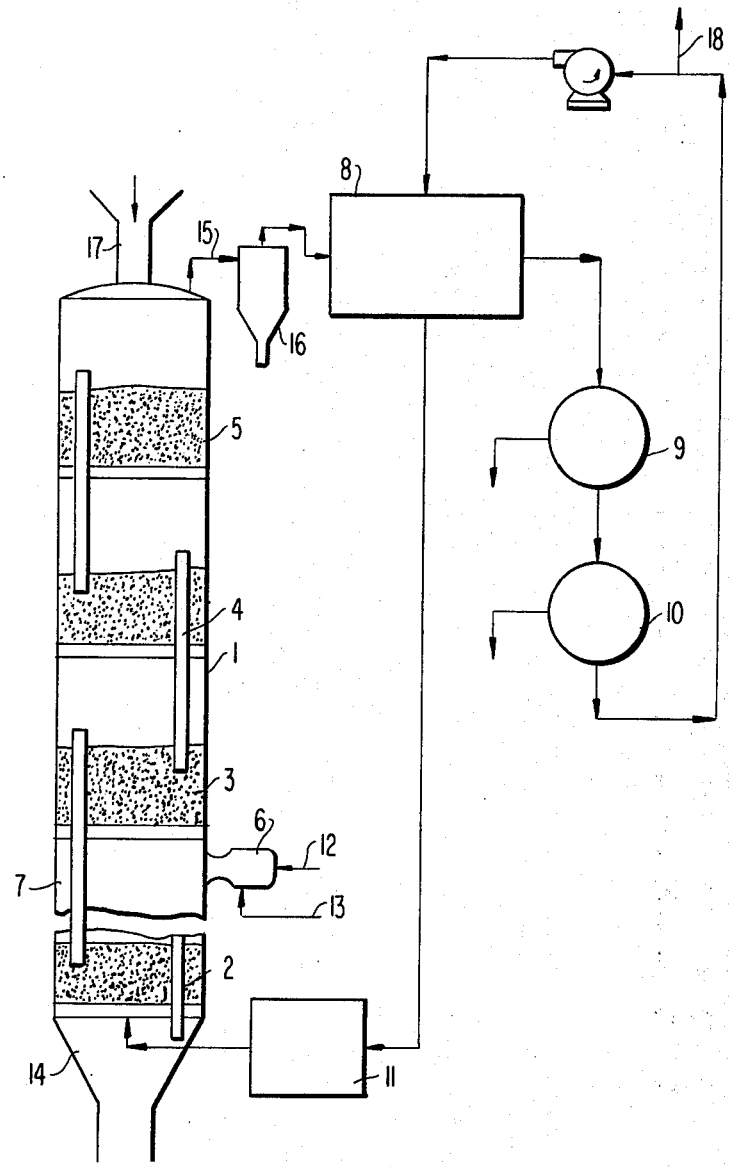

IRON ORE REDUCTION IN MULTIPLE FLUIDIZED BEDS

The present invention relates to a process for the reduction of ores and more precisely to a process for the direct reduction of ores, especially iron ores, in a fluidized-bed reactor.

There are many known processes for the direct reduction of ores in fluidized-bed reactors, which use gas or gas mixtures to reduce the ore and to fluidize the bed. The reducing and fluidizing gas for these processes is produced in special plants, for instance by the steam-reforming process, starting from hydrocarbons and steam. However, that process requires separate plants for gas production and these are very costly, thus markedly increasing the cost of the final product.

Another way of preparing the reducing gases is also known, involving the partial combustion of fuel oil and other higher hydrocarbons.

The injection of a substoichiometric mixture of hydrocarbons and air directly into the reducing bed has also been proposed. Although this does away with the costly plants previously needed to make reducing gases, it has its drawbacks: for instance, the sulphur content of the fuel oil, which contaminates the metal produced, the fact that part of the hydrocarbon cracks producing carbon black directly in the reducing bed, and the fact that the nitrogen contained in the air used builds up in the plant.

An object of the present invention is to eliminate these drawbacks, permitting direct reduction of ores in fluid beds cheaply and with no possibility of the metal produced being contaminated with sulphur.

According to the present invention, ores and especially iron ores, are reduced directly in a multistage fluid-bed reactor, in which the reducing and fluidizing gases are the products of partial combustion of methane with oxygen, the gases being introduced into an intermediate zone of the reducing tower above the stage or stages where final metallization occurs. The process takes place at pressures of between 1 and 5 atmospheres and methane and oxygen in substoichiometric proportions, are introduced into a combustion chamber, the outlet of which is connected to the reactor in an intermediate zone, for instance: between the last and the next-to-the-last reduction beds. In the reduction chamber the methane reacts with the oxygen to produce carbon monoxide, hydrogen and water and a small percentage of carbon dioxide. Part of the methane, generally less than 10%, remains unburnt and circulates in the reactors without causing trouble. The gas thus produced, together with the gas coming from the lower stages of metallization, passes through the upper beds where the ore is in a low-reduced state. In this way the amounts of $CO_2$ and $H_2O$ present do not hinder the progress of this phase of the reduction process. Once the reducing gas has passed through the reactor and emerged from its top, the dust and the water it has picked up are separated out and the $CO_2$ removed, after which the gas is reheated and sent to the last reducing bed.

In this way, the reducing gas, composed essentially of CO and $H_2$, is fed precisely in the zone where the presence of a pure reducing gas is most necessary, thus completing the ore reduction process. The carbon black produced in the partial combustion chamber can be removed before it enters through the grating of the overlying fluidized bed.

The present invention will now be described in greater detail in relation to an embodiment, which is intended to be purely explanatory and in no way limiting as regards the purpose of the invention, reference being made also to the accompanying drawing, which illustrates schematically a plant which can perform the process of this invention.

Referring now to the drawing in greater detail, methane and oxygen are sent via pipes 12 and 13 to combustion chamber 6, where the methane is partly burnt with the oxygen, the oxygen being fed in substoichiometric quantities. The hot gases from the combustion are stripped of carbon black and sent to chamber 7 disposed between beds 2 and 3 of reactor 1. The percentage composition, by volume, of the gases is $H_2$:45–53, CO:28–33, $CO_2$:8–4, $H_2O$:9–4, $CH_4$:5–2. They are mixed in chamber 7 with the gases recycled through chamber 14, which have passed through the final metallization bed 2 completing reduction of the burden. The mixture thus obtained passes upwards to fluidize and reduce the ore contained in beds 3, 4 and 5 respectively, becoming richer in $CO_2$ and $H_2O$ and poorer in CO and $H_2$ at each stage of reduction. The gas mixture leaves the reactor through pipe 15, is dedusted in cyclone 16 and then passes to the heat exchanger 8 where it is cooled.

From here the gas is sent to units 9 and 10 where water and carbon dioxide are stripped, respectively. Then some of the cleaned gas is bled off at 18, while the remainder is recycled through unit 8 where it is preheated by indirect heat exchange with the gas leaving reactor 1 through pipe 15. From 8, the gas is sent to the final heating furnace 11, from which it re-enters reactor 1 at 14.

The ore is introduced to reactor 1 through feeder 17 and flows down through beds 5, 4, 3 and 2 in countercurrent with the fluidizing and reducing gas. From the last reducing bed 2, which may also be considered the final metallization bed, the product is discharged at a degree of reduction that exceeds 93%.

EXAMPLE

An iron ore containing 65% total Fe, with an average grain size of 1 mm, is fed at a rate of 6300 kg/hr to a four-stage fluid-bed reducing tower. Between the last stage, which is the final metallization stage, and the next-to-the-last stage, combustion gas having the following percentage composition by volume: $H_2$:50.3, CO:31.6, $CO_2$:6.1, $H_2O$:7.4 and $CH_4$:4.6, obtained by the partial combustion of methane and oxygen in a volumetric ratio of 1:0.7, is introduced at a flow rate of 3800 $Nm^3$/hr and a temperature of 900° C, below the grating of the penultimate fluidizing stage. The gases are mixed with those coming from the last stage and the resulting mixture has a flow rate of 19,400 $Nm^3$/hr, a temperature of 740° C, and the following percentage composition by volume: $H_2$:58.4, CO:18.3, $CO_2$:1.9, $H_2O$:4.4 and $CH_4$:17.0.

The gases coming from the reduction of the ore in the upper fluidizing beds and leaving the reactor at the top have a flow rate of 19,400 $Nm^3$/hr and a temperature of 540° C and are stripped of dust, $H_2O$ and $CO_2$ and 900 $Nm^3$/hr is withdrawn and the remainder is heated by indirect heat exchange with the off-gases and is further heated in a furnace and is recycled to the last metallization bed, which it enters at a flow rate of 15,600 $Nm^3$/hr, a temperature of 760° C, and the following percentage composition by volume: $H_2$:64, CO:16 and $CH_4$:20, and where reduction of the burden is completed. Fine-grained sponge iron, with a degree of reduction of 95.4% is discharged from the reactor.

From a consideration of the foregoing disclosure, therefore, it will be evident that the initially recited object of the present invention has been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A process for the reduction of iron ore in a multistage fluid bed reactor in which a plurality of beds of iron ore are fluidized by passing reducing gases upwardly from the last bed to the first bed, while the iron ore passes from the first bed to the last bed, comprising producing a first portion of said reducing gases by partially combusting methane with a substoichiometric quantity of oxygen, introducing said first portion between said first and last beds, producing a second portion of said reducing gases by removing gas from said first bed, stripping $CO_2$ and $H_2O$ from said second portion, and introducing into said last bed a fluidizing gas consisting essentially of only said stripped second portion.

2. A process as claimed in claim 1, and vertically superposing said beds, and moving said ore from bed to bed downwardly by gravity.

3. A process as claimed in claim 2, in which said first portion is introduced above said last bed and below the next to last bed through which said ore passes.

4. A process as claimed in claim 1, in which said methane and oxygen prior to combustion have a volumetric ratio to each other of about 1:0.7.

5. A process as claimed in claim 1, in which said first portion is introduced between said last bed and the next to last bed through which said ore passes.

* * * * *